(12) United States Patent
Lee et al.

(10) Patent No.: US 9,288,708 B2
(45) Date of Patent: *Mar. 15, 2016

(54) SYSTEM AND METHOD FOR DELIVERING PUSH MESSAGE

(71) Applicant: KT CORPORATION, Gyeonggi-do (KR)

(72) Inventors: Ki-Ho Lee, Gyeonggi-do (KR); Jong-Ho Park, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/529,123

(22) Filed: Oct. 30, 2014

(65) Prior Publication Data

US 2015/0055642 A1 Feb. 26, 2015

Related U.S. Application Data

(63) Continuation of application No. 13/362,060, filed on Jan. 31, 2012, now Pat. No. 8,913,516.

(30) Foreign Application Priority Data

Jan. 31, 2011 (KR) ........................ 10-2011-0009681

(51) Int. Cl.
*H04W 4/00* (2009.01)
*H04W 28/02* (2009.01)
*H04L 12/18* (2006.01)
(Continued)

(52) U.S. Cl.
CPC ....... *H04W 28/0215* (2013.01); *H04L 12/1859* (2013.01); *H04L 12/5855* (2013.01); *H04L 51/14* (2013.01); *H04L 61/2038* (2013.01); *H04L 67/26* (2013.01); *H04W 4/12* (2013.01); *H04L 12/5895* (2013.01); *H04W 84/12* (2013.01); *H04W 88/06* (2013.01); *H04W 88/16* (2013.01)

(58) Field of Classification Search
CPC .... H04W 4/12; H04W 84/12; H04W 28/0215
USPC ................................................ 370/252, 338
See application file for complete search history.

(56) References Cited

U.S. PATENT DOCUMENTS 7,260,072 B2 8/2007 Lee et al.
7,796,514 B2 9/2010 Noriega
(Continued)

FOREIGN PATENT DOCUMENTS

KR 10-2005-0028582 A 3/2005
KR 10-2005-0068400 A 7/2005
(Continued)

*Primary Examiner* — Sai-Ming Chan
(74) *Attorney, Agent, or Firm* — IP Legal Services, LLC

(57) ABSTRACT

A system may deliver a push message to user equipment. The system may include a push notification server and a mobile communication core network. The push notification server may be configured to create and transmit a push message when a certain data is updated. The mobile communication core network may be configured to receive the push message from the push notification server, determine whether a user equipment associated with the push message is connected to a wireless local area network (WLAN) access network, and transmit the push message to the user equipment through at least one of a mobile communication radio access network and the WLAN access network based on the determination.

20 Claims, 3 Drawing Sheets

(51) Int. Cl.
*H04L 12/58* (2006.01)
*H04L 29/12* (2006.01)
*H04L 29/08* (2006.01)
*H04W 4/12* (2009.01)
*H04W 84/12* (2009.01)
*H04W 88/16* (2009.01)
*H04W 88/06* (2009.01)

(56) References Cited

U.S. PATENT DOCUMENTS

| | | | |
|---|---|---|---|
| 2004/0172254 A1* | 9/2004 | Sharma et al. | 704/270.1 |
| 2006/0178153 A1 | 8/2006 | Tenny et al. | |
| 2009/0176520 A1 | 7/2009 | B. S. et al. | |
| 2009/0238143 A1 | 9/2009 | Mukherjee et al. | |
| 2010/0008324 A1 | 1/2010 | Lee et al. | |
| 2010/0015978 A1 | 1/2010 | Yoon et al. | |
| 2010/0075679 A1 | 3/2010 | Tenny et al. | |
| 2011/0013560 A1 | 1/2011 | Zhang et al. | |
| 2011/0072101 A1 | 3/2011 | Forssell et al. | |
| 2011/0092214 A1 | 4/2011 | Iwamura | |

FOREIGN PATENT DOCUMENTS

| | | |
|---|---|---|
| KR | 10-2005-0121136 A | 12/2005 |
| KR | 10-2006-0124123 A | 12/2006 |
| KR | 10-0700020 B1 | 3/2007 |
| KR | 10-2007-0110348 A | 11/2007 |
| KR | 10-2008-0026855 A | 3/2008 |
| KR | 10-2008-0080801 A | 9/2008 |
| KR | 10-0920894 B1 | 10/2009 |
| KR | 10-2010-0003664 A | 1/2010 |
| KR | 10-2010-0004833 A | 1/2010 |
| KR | 10-2010-0021156 A | 2/2010 |
| KR | 10-2010-0029869 A | 3/2010 |
| KR | 10-2010-0060353 A | 6/2010 |
| KR | 10-2010-0092742 A | 8/2010 |
| KR | 10-2010-0126776 A | 12/2010 |
| KR | 10-2010-0126818 A | 12/2010 |
| KR | 10-2010-0133821 A | 12/2010 |
| KR | 10-2011-0099327 A | 9/2011 |
| WO | 2007/105888 A1 | 9/2007 |

* cited by examiner

SYSTEM AND METHOD FOR DELIVERING PUSH MESSAGE

CROSS REFERENCE TO PRIOR APPLICATIONS

The present application is continuation application of U.S. patent application Ser No. 13/362,060 (filed on Jan. 31, 2012), which claims priority under 35 U.S.C. §119 to Korean Patent Application No. 10-2011-0009681 (filed on Jan. 31, 2011), which is hereby incorporated by reference in its entirety.

FIELD OF THE INVENTION

The present invention relates to communications and, in particular, to exchange of messages between wireless devices and networks.

BACKGROUND OF THE INVENTION

Lately, smart-phones have become popular among users of communications devices. A smart-phone has convenient features that enable a user to perform in a variety of locations many activities, such as watching movies, listening to songs, web-browsing, and checking e-mails. However, a smart phone may generate a large amount of data traffic, which is about ten times greater than that of a phone with typical features. Particularly, wireless data traffic in mobile communication networks has dramatically increased after the introduction of smart-phones. Mobile communication service providers constantly search for new ways to reduce amounts of data traffic in a mobile communication network.

In general, a smart-phone may be in an "Always-on" state: the smart-phone is always connected to a corresponding mobile communication network (such as a universal mobile telecommunication system (UMTS) network, a global system for mobile communication (GSM), and a long term evolution (LTE) advanced network). Since the smart-phone is in an Always-on state, the smart-phone may receive messages from other parties in a mobile communication network. A push message may be one of several types of messages delivered to a user's smart-phone or other wireless communication device (i.e., "user equipment") in an Always-on state. The push message may inform a user of new e-mails or updated news. The push message may be created and transmitted from a push notification server. For example, when a certain type of data designated by a user is updated, the push notification server may create a push message and transmit the push message to the corresponding user equipment. Since a push message is frequently generated and transmitted to the user equipment through a mobile communication network, the push message may be a source that increases an amount of data traffic in the mobile communication network.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a system may deliver a push message to a user equipment through at least one of a mobile communication radio access network and a wireless local area network (WLAN) access network.

In accordance with another aspect of the present invention, a system may deliver a push message to a user equipment through a WLAN access network when the user equipment is connected to a WLAN access network.

In accordance with another aspect of the present invention, a user equipment may receive a push message from a push notification server through at least one of a mobile communication radio access network and a WLAN access network.

In accordance with another aspect of the present invention, a user equipment may receive a push message from a push notification server through a WLAN access network when the user equipment is connected to a WLAN access network.

In accordance with an embodiment of the present invention, a system may deliver a push message to a user equipment. The system may include a push notification server and a mobile communication core network. The push notification server may be configured to create and transmit a push message for updated data. The mobile communication core network configured to, in response to the push message, i) determine whether the user equipment associated with the push message is connected to a wireless local area network (WLAN) access network, and ii) transmit the push message to the user equipment through at least one of a mobile communication radio access network and the WLAN access network based on the determination.

The mobile communication core network may transmit the push message to WLAN access network when the mobile communication core network determines that the user equipment is connected to the WLAN access network. Further, the mobile communication core network may transmit the push message to the mobile communication radio access network when the mobile communication core network determines that the user equipment is not connected to the WLAN access network.

The mobile communication core network may be a universal mobile telecommunication system (UMTS) core network. In this case, the UMTS core network may include a gateway general packet radio service (GPRS) support node and a serving GPRS support node. The gateway GPRS support node may be configured to, based on the push message from the push message notification server, i) determine whether the user equipment is connected to the WLAN access network, and ii) select one of a UMTS terrestrial radio access network (UTRAN) and the WLAN access network based on the determination. The serving GPRS support node may be configured to transfer the push message from the gateway GPRS support node to the selected one of the UTRAN and the WLAN access network.

The gateway GPRS support node may select the WLAN access network when the user equipment is connected to the WLAN access network. Otherwise, the gateway GPRS support node may select the UTRAN.

The gateway GPRS support node may determine whether the user equipment is connected with the WLAN access network from an address mapping table. The address mapping table may include information on mapping relation among a UMTS address, a WLAN address, and an identifier of the user equipment.

The gateway GPRS support node may be configured to generate an address mapping table by mapping the UMTS address information and the WLAN address information from the user equipment with an identifier of the user equipment, and determine whether the user equipment is connected with the WLAN access network based on the address mapping table. The UMTS address information may include information on a UMTS address allocated from the UMTS core network. The WLAN address information may include information on a WLAN address allocated from the WLAN access network.

The gateway GPRS support node may be configured to determine that the user equipment is connected with the WLAN access network when the WLAN address of the user equipment is included in the address mapping table, and determine that the user equipment is not connected with the WLAN access network when the WLAN address of the user equipment is not included in the address mapping table.

The UMTS address may be an Internet Protocol (IP) address of the user equipment from a Node B and allocated by the gateway GPRS support node. The WLAN address may be an Internet Protocol (IP) address of the user equipment from an access point and allocated by the gateway GPRS support node.

The gateway GPRS support node may delete the WLAN address information from the address mapping table when the user equipment is disconnected from the WLAN access network.

The gateway GPRS support node may select one of the UTRAN and the WLAN access network based on the determination and transmit a request message to the service GPRS support node to transmit the push message to the user equipment through the selected one of the UTRAN and the WLAN access network. Then, the serving GPRS support node may transmit the push message to the user equipment through the selected one of the UTRAN and the WLAN access network in response to the request message.

The gateway GPRS support node may transmit the determination and the push message to the serving GRPS support node. Then, the serving GPRS support node may select one of the UTRAN and the WLAN access network based on the determination and transmits the push message to the user equipment through the selected one of the UTRAN and the WLAN access network.

The gateway GPRS support node may include a register, a memory, a receiver, a determiner, and a transmitter. The register may be configured to, based on a UMTS address and a WLAN address from the user equipment, create an address mapping table by mapping the UMTS address and the WLAN address with an identifier of the user equipment. The memory may be configured to store the address mapping table. The receiver may be configured to be coupled to an Internet and receive messages through the Internet. The determiner may be configured to determine whether the received message is a push message based on an origination address of the received message and determine whether the user equipment is connected to the WLAN access network based on the address mapping table. The transmitter may be configured to receive the determination from the determiner and provide the push message to one of the UTRAN and the WLAN access network based on the received determination.

The register may delete the WLAN IP address from the address mapping table when the user equipment is disconnected from the WLAN access network. The determiner may determine that the received message is the push message when the origination address of the received message is matched with the address of the push notification server. The determiner may determine that the user equipment is connected with the WLAN access network when the address mapping table includes the WLAN address of the user equipment.

In accordance with another exemplary embodiment of the present invention, a user equipment may be provided for receiving a push message. The user equipment may include a wireless local area network (WLAN) interface unit, a mobile communication network interface unit, and a receiver. The WLAN interface unit may be configured to couple the user equipment with a WLAN access network and transfer data through the WLAN access network. The mobile communication network interface unit may be configured to couple the user equipment with a mobile communication radio access network and transfer data through the mobile communication radio access network. The receiver may be configured to receive a push message from a push notification server through at least one of the WLAN interface unit and the mobile communication interface. The receiver may receive the push message through the WLAN interface unit when the user equipment is connected to the WLAN access network.

The user equipment may further include a memory and a register. The memory may be configured to store first address information and second address information. The register may be configured to transmit the first address information and the second address information to a mobile communication core network when the second address information is stored in the memory. The first address information may be information on a first address. The mobile communication radio access network may allocate the first address to the user equipment and the mobile communication network interface unit may receive the first address from the mobile communication radio access network. The second address information may be information on a second address. The WLAN access network may allocate the second address to the user equipment and the WLAN interface unit may receive the second address from the WLAN access network.

In accordance with another exemplary embodiment of the present invention, a method is provided for delivering a push message to user equipment. The method may include, in response to a push message, determining whether the user equipment is connected with a wireless local area network (WLAN) access network, transmitting the push message to the user equipment through the WLAN access network when the user equipment is connected with the WLAN access network, and transmitting the push message to the user equipment through a mobile communication radio access network when the user equipment is not connected with the WLAN access network.

The method may further include examining an address mapping table of the user equipment to determine whether the address mapping table includes information on a WLAN address allocated to the user equipment from the WLAN access network, determining that the user equipment is connected with the WLAN access network when the address mapping table includes information on the WLAN address, and determining that the user equipment is not connected with the WLAN access network when the address mapping table does not include information on the WLAN address.

Prior to the receiving a push message, the method may further include receiving information on a mobile communication network address and the WLAN address from the user equipment that accesses the WLAN access network, and creating the address mapping table by mapping the mobile communication network address and the WLAN address with an identifier of the user equipment.

The method may further include deleting the WLAN address from the address mapping table when the user equipment is disconnected from the WLAN access network.

The receiving may include receiving a message through an Internet, comparing an origination address of the received message with an address of a push notification server, determining that the received message is the push message when the origination address of the received message matches the address of the push notification server, and initiating the determination of whether the user equipment is connected with a WLAN access network when the received message is the push message.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
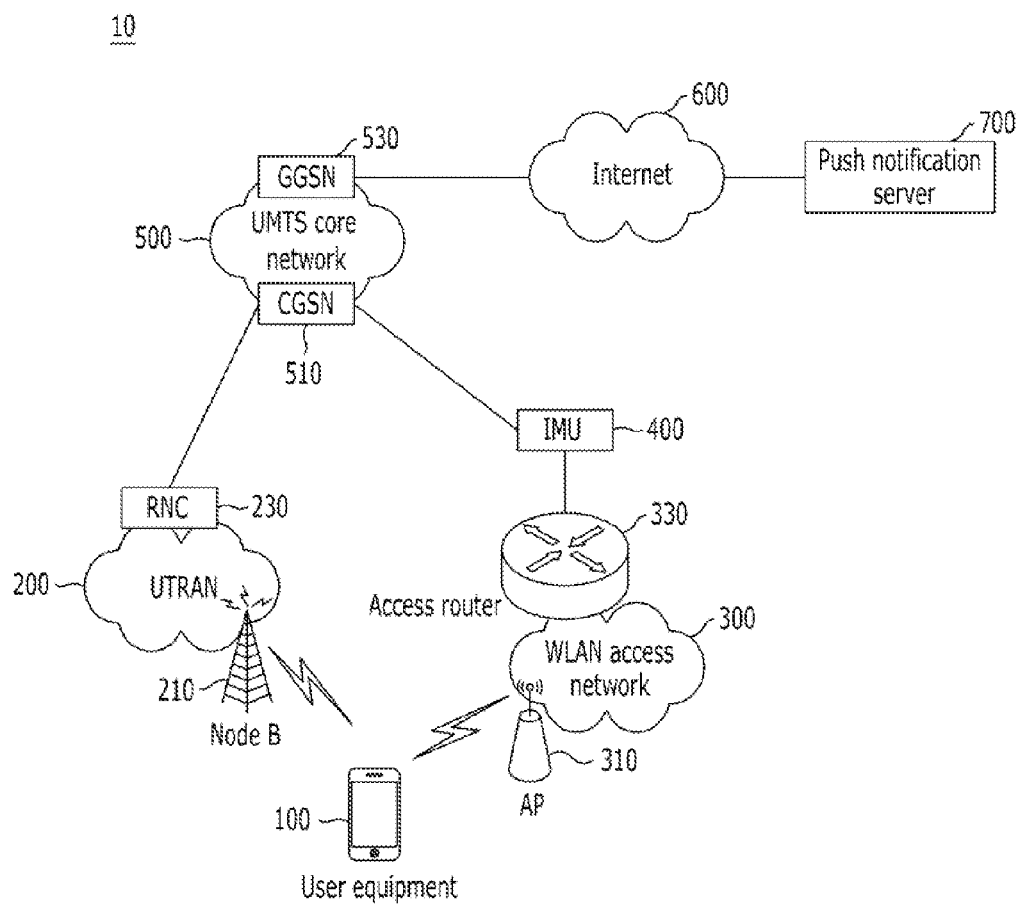
FIG. 1 illustrates a system for transmitting a push message, in accordance with an exemplary embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

For convenience and ease of understanding, a system in accordance with an exemplary embodiment of the present invention will be described as delivering a push message through a $3^{rd}$ generation partnership project universal mobile telecommunication system (3GPP UMTS) network. The present invention, however, is not limited thereto. For example, a system may deliver a push message through a global system for mobile communication (GSM) or through a long term evolution (LTE) advanced network in accordance with another embodiment.

In accordance with an exemplary embodiment of the present invention, a system may deliver a push message to a user device through at least one of a UMTS radio access network (UTRAN) and a wireless local area network (WLAN) access network. For example, the user device may include hand-held phone, lap-top or other personal computer (PC), electronic notepad/notebook/iPad or the like, or any other similar type of wireless device, termed herein as "user equipment". Particularly, the system may deliver a push message through the WLAN access network when the user equipment is connected with a WLAN such as a Wi-Fi network or a WiBro network. Such a manner may significantly reduce an overall data traffic amount in a universal mobile telecommunication system (UMTS) network. Hereinafter, a system for delivering a push message in accordance with an exemplary embodiment of the present invention is described, in detail, with reference to FIG. 1.

FIG. 1 illustrates a system for transmitting a push message, in accordance with an exemplary embodiment of the present invention.

Referring to FIG. 1, system 10 operating in accordance with an exemplary embodiment of the present invention might include user equipment 100, universal mobile telecommunication system (UMTS) core network 500, UTRN terrestrial radio access network (UTRAN) 200, wireless local area network (WLAN) access network 300, and push notification server 700. Furthermore, system 10 may include Node B 210, radio network controller (RNC) 230, access point 310, access router 330, inter-work unit (IWU) 400, serving general packet radio service support node (SGSN) 510, gateway general packet radio service support node (GGSN) 530, and Internet 600. Although system 10 is illustrated as including UMTS core network 500 and UTRAN 200, the present invention is not limited thereto. System 10 may include a GSM core network and/or a GSM radio access network in other embodiments of the present invention.

User equipment 100 may be coupled to a mobile communication core network through a radio access network. For example, the user equipment 100 may be connected to UTMS core network 500 through at least one of UTRAN 200 and the WLAN access network 300, as shown in FIG. 1. Such user equipment 100 may receive a push message from push notification server 700 through UMTS core network 500 and at least one of UTRAN 200 and WLAN access network 300. In order to support UTRAN 200 and WLAN access network 300, user equipment 100 may be configured as a dual mode and dual band type of user equipment, although one skilled in the art will realize that user equipment might further be configured to support higher numbers of modes and higher numbers of bands, depending upon the types of networks a given implementation desirably supports.

User equipment 100 may initially access the UTRAN 200 when user equipment 100 is turned on. When user equipment 100 enters a WLAN service zone thereafter, user equipment 100 may subsequently communicate with and access WLAN access network 300. Since user equipment 100 may be connected to both UTRAN 200 and WLAN access network 300, user equipment 100 may be provided with a packet service, such as a push notification service, through at least one of UTRAN 200 and WLAN access network 300.

Node B 210 may couple user equipment 100 with UTRAN 200 when user equipment 100 accesses UTRAN 200. Particularly, Node B 210 may couple user equipment 100 with UMTS core network 500 when user equipment 100 is initially turned on. After Node B 210 couples user equipment 100 with UTRAN 200, UTRAN 200 may transfer a service message from the user equipment 100 to UMTS core network 500 through RNC 230.

Access point 310 may couple user equipment 100 with WLAN access network 300 when user equipment 100 accesses WLAN access network 300. Access point 310 may transfer a service request message from user equipment 100 to UMTS core network 500 through access router 330. IMU 400 may be disposed between access router 330 and UMTS core network 500 and may couple WLAN access network with UMTS core network 500.

UMTS core network 500 may include SGSN 510 and GGSN 530. SGSN 510 may authenticate user equipment 100 that requests a packet service through UTRAN 200 or WLAN access network 300. Furthermore, SGSN 510 may deliver data packets from user equipment 100 and to user equipment 100. For example, SGSN 510 may perform packet routing and transfer, mobility management, and logical link management.

In accordance with an exemplary embodiment of the present invention, SGSN 510 may receive a push message from GGSN 530 and deliver the push message to at least one of RNC 230 and IWU 400. For example, when user equipment 100 is connected with WLAN 200, SGSN 510 may deliver the push message to the IWU 400. Otherwise, SGSN 510 may deliver the push message to RNC 230.

GGSN 530 may manage a session for providing a packet data service. GGSN 530 may route packet data and provide an interface for coupling UMTS core network 500 with Internet 600. In accordance with an exemplary embodiment of the present invention, GGSN 530 may receive a push message from a push notification server 700 through Internet 600 and transmit the push message to SGSN 510.

Furthermore, GGSN 530 may allocate an Internet Protocol (IP) address to user equipment 100. The allocated IP address may be used when user equipment 100 receives a packet service through UTRAN 200 or when user equipment 100 receives a packet service through WLAN 300. GGSN 530 may create an address mapping table by mapping an IP address of user equipment 100 to an identifier of user equipment 100.

When GGSN 530 receives a push message from the push notification server 700, GGSN 530 may search an address mapping table of a recipient of the push message, for example, user equipment 100. GGSN 530 may determine whether user equipment 100 is coupled with WLAN access network 300 based on the search result. For example, GGSN 530 may determine that user equipment 100 is coupled with WLAN access network 300 when the address mapping table of user equipment 100 includes a WLAN IP address that is allocated from WLAN access network 300.

GGSN 530 may select one of UTRAN 200 and WLAN access network 300 to deliver the push message based on the determination result. For example, when GGSN 530 determines that user equipment 100 is connected with WLAN access network 300, GGSN 530 may select WLAN access network 300 to deliver the push message. Otherwise, GGSN 530 may select UTRAN 200 to deliver the push message.

When GGSN 530 selects WLAN access network 300 to deliver the push message, GGSN 530 may provide a request to SGSN 510 to transmit the push message to IWU 400. Otherwise, GGSN 530 may provide the request to SGSN 510 to transmit the push message to RNC 230. In order to provide the request to SGSN 510, GGSN 530 may transmit a request message to SGSN 510 with the selection result.

Instead of providing the request to SGSN 510, GGSN 530 may transfer the push message to SGSN 510 with the determination result. SGSN 510 may select one of UTRAN 200 and WLAN access network 300 based on the determination result, and then transfer the push message through the selected one of UTRAN 200 and WLAN access network 300.

Push notification server 700 may generate a push message when certain data is updated. A user may designate data to be updated, such as an e-mail or interested news. The push message may inform a user of the update of the selected data. For example, push notification server 700 may generate a push message when new mails or messages are received. In order to transmit the push message to user equipment 100, push notification server 700 may transmit the generated push message to a mobile communication core network such as UMTS core network 500 through Internet 600.

As described above, system 10 may deliver the push message to user equipment 100 through WLAN access network 300 when user equipment 100 is connected with WLAN access network 300. Accordingly, an overall data traffic amount in a mobile communication network may be reduced because the push message is delivered to the user equipment through a WLAN, in accordance with an exemplary embodiment of the present invention.

Figure 2:
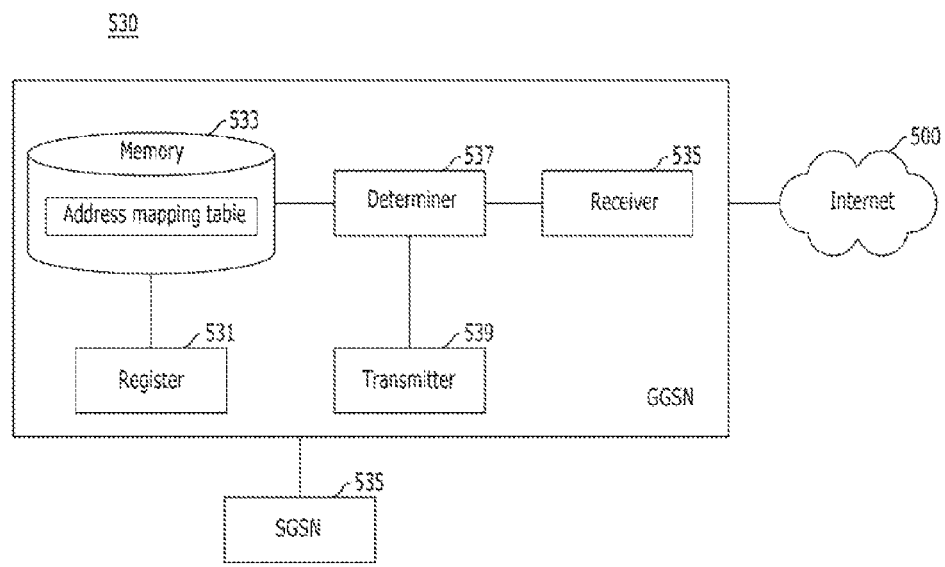
FIG. 2 illustrates a gateway general packet radio service support node (GGSN) as might be employed in accordance with exemplary embodiments of the present invention.

FIG. 2 illustrates, in detail, an exemplary embodiment of a GGSN, such as GGSN 530 of FIG. 1, operating in accordance with one or more embodiments of the present invention.

In accordance with an exemplary embodiment of the present invention, GGSN 530 may receive a push message from push notification server 700 through Internet 600 and transmit the received push message to user equipment 100 through SGSN 510. Furthermore, GGSN 530 may allocate an IP address to user equipment 100, the IP address employed for receiving a push message through at least one of UTRAN 200 and WLAN access network 300. Hereinafter, the GGSN 530 will be described, in detail, with reference to FIG. 2.

Referring to FIG. 2, GGSN 530 may include register 531, memory 533, receiver 535, determiner 537, and transmitter 539.

Register 531 may receive a 3G IP address from user equipment 100 connected to WLAN access network 300, but the present invention is not limited thereto. For example, register 531 may receive a 3G IP address and/or a WLAN IP address from user equipment 100. The 3G IP address may be an IP address allocated to user equipment 100 to be used for UTRAN 200. The 3G IP address may be allocated through UTRAN 200. The WLAN IP address may be an IP address allocated to user equipment 100 to be employed for WLAN access network 300. Register 531 may create an address mapping table by mapping the 3G IP address and the WLAN IP address with the identifier of user equipment 100. Register 531 may store the created address mapping table in memory 533. Furthermore, register 531 may delete the WLAN IP address stored in the Address mapping table when user equipment 100 is disconnected from WLAN access network 300. In accordance with another exemplary embodiment of the present invention, register 531 may allocate an IP address to user equipment 100 that accesses UTRAN 200 or WLAN access network 300.

Receiver 535 may be coupled to Internet 600 and receive various types of messages through Internet 600. For example, receiver 535 may receive a push message from push notification server 700. Receiver 535 may transmit the received messages to determiner 537.

Determiner 537 may receive the received messages from receiver 535. Then, determiner 537 may determine whether a received message is a push message based on an origination address of the received message. For example, when the origination address of the received message is matched with an address of push notification server 700, determiner 537 may determine that the received message is a push message.

When the received data is determined as the push message, determiner 537 may determine whether user equipment 100 is connected to WLAN access network 300. In order to make such determination, determiner 537 may examine the address mapping table stored in memory 533. When the address mapping table stores a WLAN IP address, determiner 537 may determine that user equipment 100 is connected to WLAN access network 300. Determiner 537 may transmit the determination result to transmitter 539.

Transmitter 539 may receive the determination result from determiner 537 and deliver the push message to one of UTRAN 200 and WLAN access network 300 based on the received determination result. In order to deliver the push message to one of UTRAN 200 and WLAN access network 300, transmitter 539 may transmit a request message to SGSN 510 to transmit a push message to one of UTRAN 200 and WLAN access network 300. In response to the request message, SGSN 510 may transmit the push message to one of RNC 230 and IWU 400. For example, when transmitter 539 requests SGSN 510 to transmit a push message to UTRAN 200, SGSN 510 may transmit the push message to RNC 230. When transmitter 539 requests SGSN 510 to transmit a push message to WLAN 300, SGSN 510 may transmit the push message to IWU 400.

Instead of transmitting the request message to SGSN 510, transmitter 539 may transmit the received push message and the determination result of determiner 537 to SGSN 510. SGSN 510 may transmit the push message to at least one of RNC 230 and IWU 400 based on the determination result of determiner 537. As described above, the determination result may include information on whether user equipment 100 is connected with WLAN access network 300. Accordingly, SGSN 510 may transmit the push message to IWU 400 when the determination result indicates that user equipment 100 is connected with WLAN access network 300. Otherwise, SGSN 510 may transmit the push message to RNC 230.

In accordance with an exemplary embodiment of the present invention, user equipment 100 may receive a push message from push notification server 700 through at least one of UTRAN 200 and WLAN access network 300, as described above. Particularly, user equipment 100 may receive a push message through WLAN access network 300 when user equipment 100 is connected to WLAN access network 300. Hereinafter, user equipment 100 will be described in detail with reference to FIG. 3.

Figure 3:
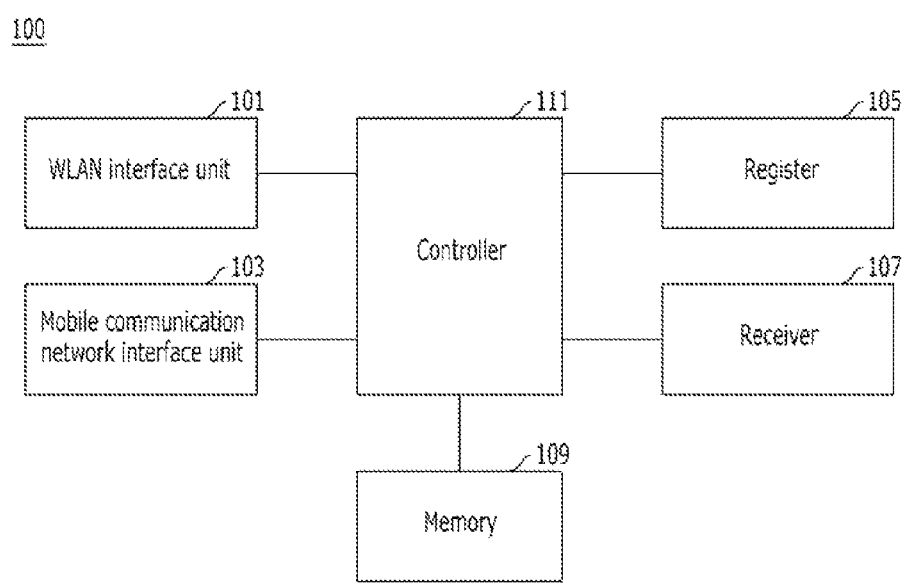
FIG. 3 illustrates user equipment as might be employed in accordance with exemplary embodiments of the present invention.

FIG. 3 illustrates user equipment as might be employed in accordance with exemplary embodiments of the present invention.

Referring to FIG. 3, user equipment 100 may include WLAN interface unit 101, mobile communication network interface unit 103, register 105, receiver 107, memory 109, and controller 111. WLAN interface unit 101 may be coupled with WLAN access network 300 and transfer data to/from the WLAN access network 300. Furthermore, WLAN interface unit 101 may receive WLAN IP address from WLAN access network 300 and store WLAN IP address in the memory 109.

Mobile communication interface unit 103 may be coupled to UTRAN 200 and transfer data to/from UTRAN 200. Furthermore, mobile communication interface unit 103 may receive the 3G IP address from UTRAN 200 and store the 3G IP address in memory 109.

Register 105 may employed when the 3G IP address and the WLAN IP address stored in the memory 109 are transmitted to t GGSN 530 through t WLAN access network 300 when t user equipment 100 accesses t WLAN access network 300. That is, when user equipment 100 receives the WLAN IP address, through register 105, the 3G IP address and the WLAN IP address of user equipment 100 are transmitted to GGSN 530. Such a process may be a request process for receiving a push message through WLAN access network 300.

Receiver 107 may receive a push message through one of WLAN interface unit 101 and mobile communication interface unit 103. For example, receiver 107 may receive a push message through WLAN interface unit 101 when user equipment 100 is connected with WLAN access network 300. Otherwise, receiver 107 may receive a push message through mobile communication interface unit 103.

Controller 111 may control mobile communication interface unit 103 to be coupled with UTRAN 200 when user equipment 100 is turned on. Then, controller 111 may receive a 3G IP address from UTRAN 200. When user equipment 100 enters a WLAN service zone, controller 111 may control WLAN interface unit 101 to be coupled to the WLAN access network 300. Then, controller 111 may receive a WLAN IP address from WLAN access network 300.

Hereinafter, a method for delivering a push message, in accordance with an exemplary embodiment of the present invention will be described, in detail, with reference to FIG. 1 to FIG. 4.

Figure 4:
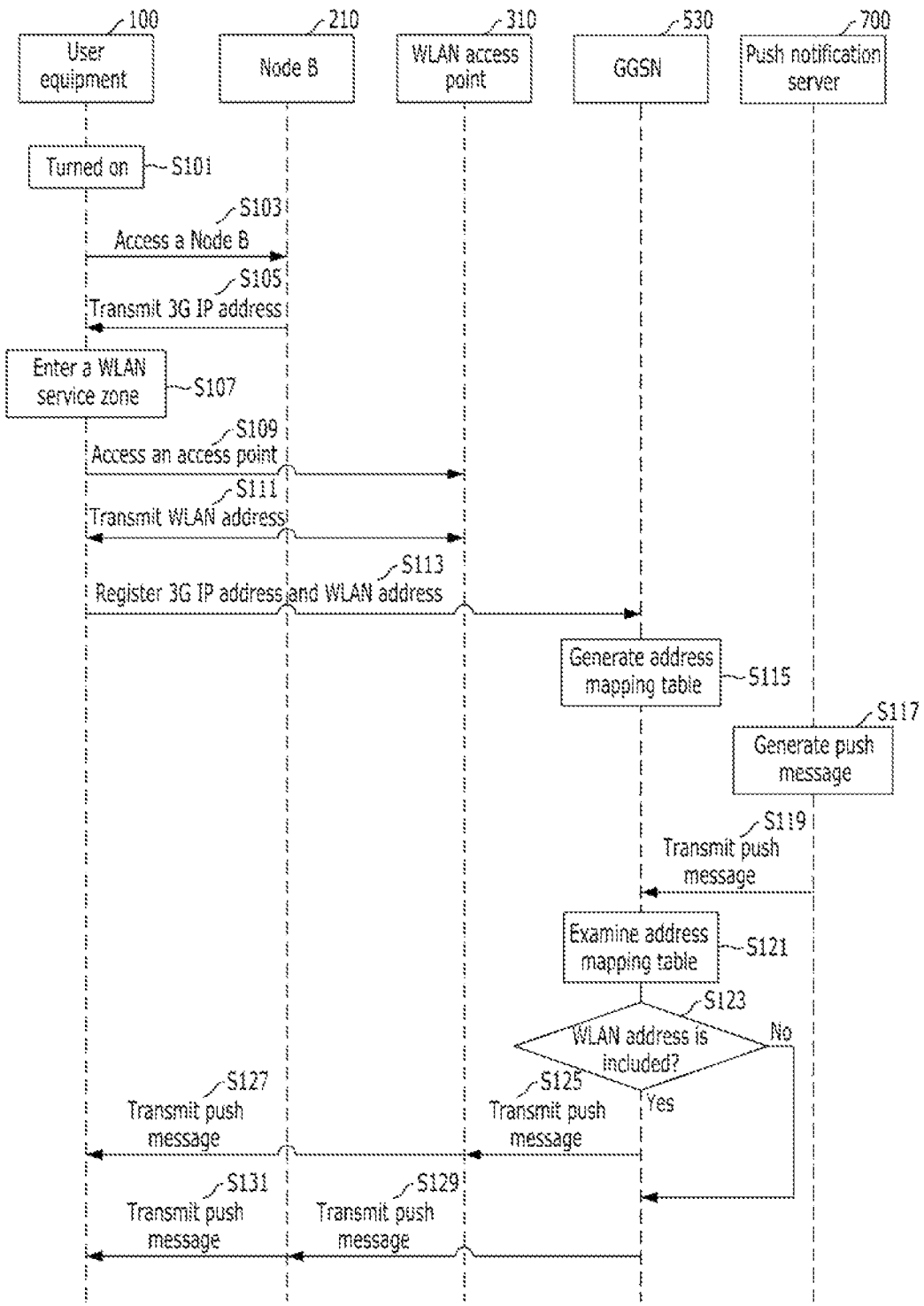
FIG. 4 illustrates a method for delivering a push message in accordance with an exemplary embodiment of the present invention.

FIG. 4 illustrates a method for delivering a push message in accordance with an exemplary embodiment of the present invention.

For convenience and ease of understanding, the method for delivering a push message will be described as delivering the push message through a UMTS core network and one of a UTRAN and a WLAN access network. The present invention, however, is not limited thereto. The push message may be delivered through a GSM core network and one of a GSM access network and a WLAN access network in another exemplary embodiment of the present invention.

Referring to FIG. 4, when user equipment 100 is turned on at step S101, user equipment 100 may access Node B 210 at step S103. User equipment 100 may receive a 3G IP address from Node B 210 at step S105. For example, the 3G IP address may be allocated to user equipment 100 by GGSN 530.

Thereafter, when user equipment 100 enters a WLAN service zone, at step S107, user equipment 100 may access point 310 at step S109 and may receive a WLAN IP address from access point 310 at step S111. For example, the WLAN IP address may be allocated to user equipment 100 by GGSN 530. The WLAN IP address may be a WLAN medium access control (MAC) address.

Upon receipt of the WLAN IP address, user equipment 100 may transmit a registration request to GGSN 530 at step S113. The registration request may include information on the 3G IP address and the WLAN IP address. GGSN 530 may generate an address mapping table based on the 3G IP address and the WLAN IP address. For instance, the Address mapping table may include a mapping relation between an identifier of user equipment 100 and the 3G IP address and/or the WLAN IP address. The identifier of user equipment 100 may be an international mobile subscriber identity or a user ID.

When a push message is created at step S117 after generating the address mapping table, push notification server 700 may transmit the push message to GGSN 530 at step S119. GGSN 530 may determine a recipient of the push message and examine an address mapping table of the determined recipient at step S121. For example, when the determined recipient is user equipment 100, GGSN 530 may determine whether the WLAN IP address of user equipment 100 is registered based on the address mapping table at step S123. For instance, when the address mapping table includes the WLAN IP address, GGSN 530 may determine that the WLAN IP address of user equipment 100 has been registered. Otherwise, when the address mapping table does not include the WLAN IP address, GGSN 530 may determine that the WLAN IP address of user equipment 100 is not registered.

When the WLAN IP address is registered, the push message may be transmitted to access point 310 at step S125 and access point 310 may deliver the push message to user equipment 100 at step S127. Otherwise, when the WLAN IP address is not registered, the push message may be transmitted to Node B 210 at step S129 and Node B 210 may deliver the push message to user equipment 100 at step S131.

The term "coupled" has been used throughout to mean that elements may be either directly connected together or may be coupled through one or more intervening elements.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A system for delivering a push message to user equipment, the system comprising:
a mobile communication core network configured to, in response to a push message, i) determine whether the user equipment associated with the push message is connected to a wireless local area network (WLAN) access network, and ii) transmit the push message to the user equipment through at least one of a mobile communication radio access network and the WLAN access network based on the determination,
wherein the push message is transmitted from a push notification server which generate the push message when certain data is updated.

2. The system of claim 1, wherein:
the mobile communication core network transmits the push message to WLAN access network when the mobile communication core network determines that the user equipment is connected to the WLAN access network; and
the mobile communication core network transmits the push message to the mobile communication radio access network when the mobile communication core network determines that the user equipment is not connected to the WLAN access network.

3. The system of claim 1, wherein:
the mobile communication core network is a universal mobile telecommunication system (UMTS) core network; and
the UMTS core network includes:
a gateway general packet radio service (GPRS) support node configured to, based on the push message from the push message notification server, i) determine whether the user equipment is connected to the wireless local area network (WLAN) access network, and ii) select the WLAN access network when the user equipment is connected to the WLAN access network or select the UMTS terrestrial radio access network (UTRAN) when the user equipment is not connected to the WLAN access network; and a serving GPRS support node configured to transfer the push message from the gateway GPRS support node to the selected one of the UTRAN and the WLAN access network.

4. The system of claim 1, wherein:
the mobile communication core network is a core network of a long term evolution(LTE) system or LTE advanced system.

5. The system of claim 3, wherein:
the gateway GPRS support node determines whether the user equipment is connected with the WLAN access network from an address mapping table;
wherein the address mapping table includes information on mapping relation among a UMTS address, a WLAN address, and an identifier of the user equipment.

6. The system of claim 3, wherein the gateway GPRS support node is configured to:
generate an address mapping table by mapping the UMTS address information and the WLAN address information from the user equipment with an identifier of the user equipment; and
determine whether the user equipment is connected with the WLAN access network based on the address mapping table,
wherein the UMTS address information includes information on a UMTS address allocated from the UMTS core network and the WLAN address information includes information on a WLAN address allocated from the WLAN access network.

7. The system of claim 6, wherein the gateway GPRS support node is configured to:
determine that the user equipment is connected with the WLAN access network when the WLAN address of the user equipment is included in the address mapping table; and
determine that the user equipment is not connected with the WLAN access network when the WLAN address of the user equipment is not included in the address mapping table.

8. The system of claim 6, wherein:
the UMTS address is an Internet Protocol (IP) address of the user equipment from a Node B and allocated by the gateway GPRS support node; and
the WLAN address is an Internet Protocol (IP) address of the user equipment from an access point and allocated by the gateway GPRS support node.

9. The system of claim 6, wherein the gateway GPRS support node deletes the WLAN address information from the address mapping table when the user equipment is disconnected from the WLAN access network.

10. The system of claim 3, wherein:
the gateway GPRS support node selects one of the UTRAN and the WLAN access network based on the determination and transmits a request message to the service GPRS support node to transmit the push message to the user equipment through the selected one of the UTRAN and the WLAN access network; and
the serving GPRS support node transmits the push message to the user equipment through the selected one of the UTRAN and the WLAN access network in response to the request message.

11. The system of claim 3, wherein:
the gateway GPRS support node transmits the determination and the push message to the serving GRPS support node; and
the serving GPRS support node selects one of the UTRAN and the WLAN access network based on the determination and transmits the push message to the user equipment through the selected one of the UTRAN and the WLAN access network.

12. The system of claim 3, wherein the gateway GPRS support node includes:
a register configured to, based on a UMTS address and a WLAN address from the user equipment, create an address mapping table by mapping the UMTS address and the WLAN address with an identifier of the user equipment;
a memory configured to store the address mapping table;
a receiver configured to be coupled to an Internet and receive messages through the Internet;
a determiner configured to determine whether the received message is a push message based on an origination address of the received message and determine whether the user equipment is connected to the WLAN access network based on the address mapping table; and
a transmitter configured to receive the determination from the determiner and provide the push message to one of the UTRAN and the WLAN access network based on the received determination.

13. The system of claim 12, wherein:
the register deletes the WLAN IP address from the address mapping table when the user equipment is disconnected from the WLAN access network;
the determiner determines that the received message IS the push message when the origination address of the received message is matched with the address of the push notification server; and
the determiner determines that the user equipment is connected with the WLAN access network when the address mapping table includes the WLAN address of the user equipment.

14. User equipment for receiving a push message, the user equipment comprising:
a wireless local area network (WLAN) interface unit configured to couple the user equipment with a WLAN access network and transfer data through the WLAN access network;
a mobile communication network interface unit configured to couple the user equipment with a mobile communication radio access network and transfer data through the mobile communication radio access network; and
a receiver configured to receive a push message from a push notification server through at least one of the WLAN interface unit and the mobile communication interface, the push message being created and transmitted by the push notification server when certain data is updated,
wherein the receiver receives the push message through the WLAN interface unit when the user equipment is connected to the WLAN access network and receives the push message through the mobile communication interface when the user equipment is not connected to the WLAN access network.

15. The user equipment of claim 14, further comprising:
a memory configured to store first address information and second address information; and
a register configured to transmit the first address information and the second address information to a mobile communication core network when the second address information is stored in the memory,
wherein:
the first address information is information on a first address; and
the mobile communication radio access network allocates the first address to the user equipment and the mobile communication network interface unit receives the first address from the mobile communication radio access network, and wherein:

the second address information is information on a second address; and the WLAN access network allocates the second address to the user equipment and the WLAN interface unit receives the second address from the WLAN access network.

16. A method for delivering a push message to user equipment, the method comprising:

in response to a push message, determining, at a mobile communication core network, whether the user equipment is connected with a wireless local area network (WLAN) access network, the push message being created and transmitted by a push notification server when certain data is updated;

transmitting, at the mobile communication core network, the push message to the user equipment through the WLAN access network when the user equipment is connected with the WLAN access network; and transmitting, at the mobile communication core network, the push message to the user equipment through a mobile communication radio access network when the user equipment is not connected with the WLAN access network.

17. The method of claim 16, further comprising:

examining an address mapping table of the user equipment to determine whether the address mapping table includes information on a WLAN address allocated to the user equipment from the WLAN access network;

determining that the user equipment is connected with the WLAN access network when the address mapping table includes information on the WLAN address; and determining that the user equipment is not connected with the WLAN access network when the address mapping table does not include information on the WLAN address.

18. The method of claim 16, prior to the receiving a push message, further comprising:

receiving information on a mobile communication network address and the WLAN address from the user equipment that accesses the WLAN access network; and creating the address mapping table by mapping the mobile communication network address and the WLAN address with an identifier of the user equipment.

19. The method of claim 16, further comprising:

deleting the WLAN address from the address mapping table when the user equipment is disconnected from the WLAN access network.

20. The method of claim 16, wherein the receiving includes:

receiving a message through an Internet;

comparing an origination address of the received message with an address of a push notification server;

determining that the received message is the push message when the origination address of the received message matches the address of the push notification server; and initiating the determination of whether the user equipment is connected with a WLAN access network when the received message is the push message.

\* \* \* \* \*